March 1, 1938.　　　C. P. XENIS　　　2,109,517
CONNECTER AND METHOD OF APPLYING SAME
Filed July 31, 1936
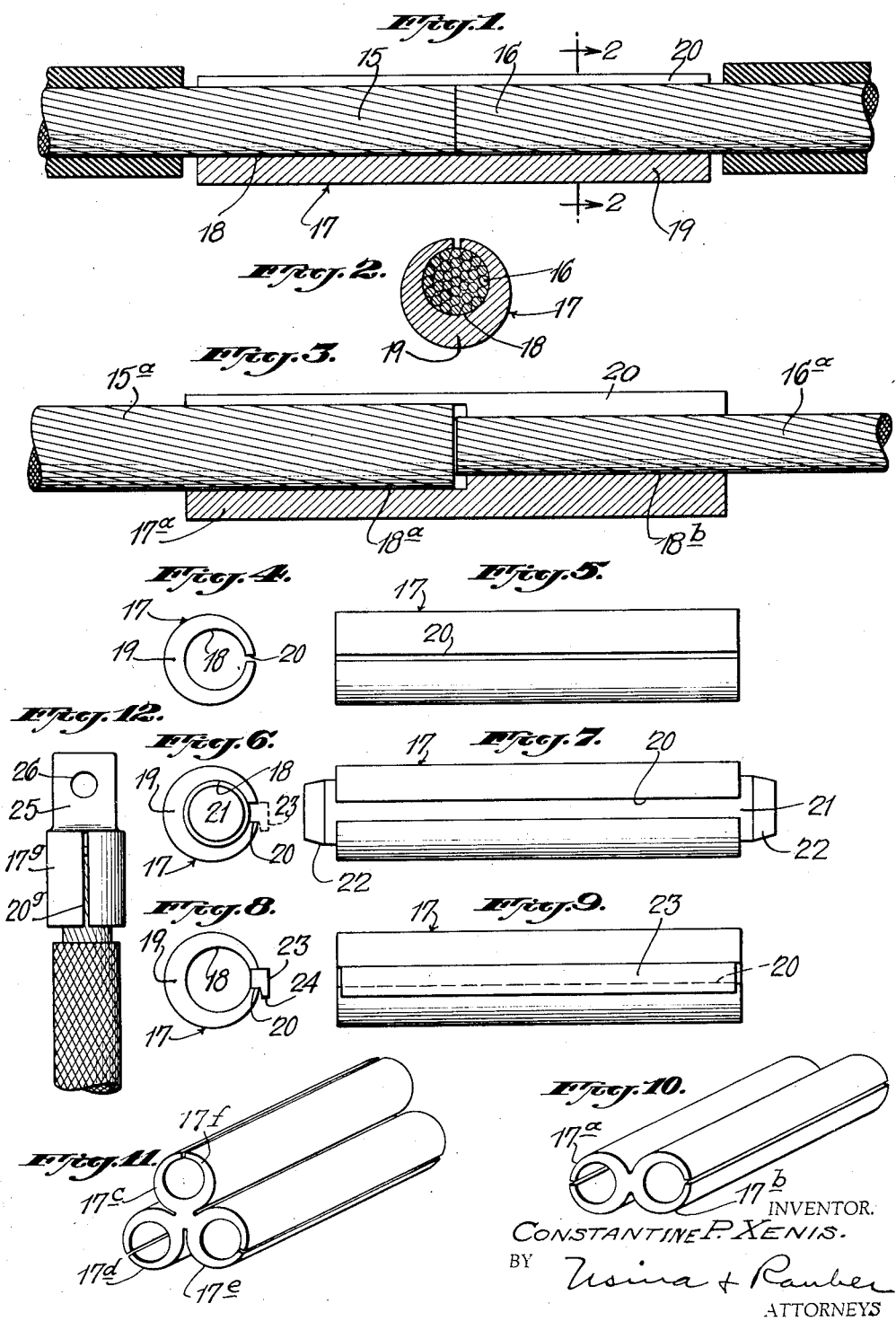
INVENTOR.
CONSTANTINE P. XENIS.
BY
ATTORNEYS Patented Mar. 1, 1938

2,109,517

UNITED STATES PATENT OFFICE 2,109,517

CONNECTER AND METHOD OF APPLYING SAME

Constantine P. Xenis, Little Neck, N. Y.

Application July 31, 1936, Serial No. 93,596

10 Claims. (Cl. 173—263)

This invention relates to an improved connecter for joining the ends of conductors or similar parts. The invention also contemplates a novel method of joining such parts.

Heretofore, in the joining of conductors or cables, sleeves have been fitted to the ends thereof and then subjected to either a drawing operation or to swaging operations to bring about an intimate engagement of the parts. Such prior practice, in many cases, involves the use of drawing dies, swaging tools, rolling devices, or cartridge actuated compression devices, all of which are relatively expensive and cumbersome in operation. Cable or other conductor connections frequently have to be made under ground in manholes, or in other locations where there are extremely limited working spaces and it is highly desirable to provide a connecter which requires no special tools, or equipment to be carried into such limited spaces.

Connecters consisting of slotted tubular sleeves into which cables are inserted and soldered in place are commonly used in underground work. The high cost of this operation and the objectionable appearance of solderpots and kerosene furnaces on city streets and the large number of accidents resulting from the use and handling of molten solder are the main objections to this old procedure.

Another type of connecter heretofore used is the so-called "mechanical type" which requires no solder. In this old type radial pressure is obtained by compressing slotted conical wedges. The main objections to this type of connection is its relatively high cost, the fact that the effectiveness of connection depends on the tightening of the parts to an extent which cannot be predetermined, so that the human element is an important factor in its proper installation, and also because the various threaded connections which are depended upon to maintain the necessary pressures may loosen up as the result of vibration.

The advantages of my novel type of connecter in this respect are, namely:

It is less expensive to manufacture, it is easier to apply, predetermined pressures are obtained and there is nothing to loosen up.

One object of the present invention is to provide a simplified connecter for wires and cables which can be preconditioned at the factory so that when a joint is to be made in the field no cumbersome or special tools will be required for the distortion of the connecter sleeve. Another object is to provide a connecter which can be readily and inexpensively manufactured and which will yet effectively perform its intended function.

Another object of the invention is to provide an improved method for quickly making conductor or cable connections.

The above and other objects will be apparent from the following detailed disclosure when read in connection with the accompanying drawing and the features of patentable novelty will be pointed out with particularity in the appended claims.

In the drawing—

Fig. 1 illustrates a cable joint made in accordance with and embodying the present invention; Fig. 2 is a cross section on line 2—2 of Fig. 1; Fig. 3 is a view similar to Fig. 1, but showing the manner of connecting two conductors of different diameters; Fig. 4 is an end view of my improved connecter; Fig. 5 is a side elevation thereof; Figs. 6 and 7 illustrate steps in the method of preparing the connecter for subsequent use; Fig. 8 is an end view of the connecter and its separator ready to be applied to the ends of conductors or cables to be united; Fig. 9 is a side elevation of Fig. 8; Figs. 10 and 11 are views of modified forms of multiple connecters embodying the invention; Fig. 12 is a view showing the application of the invention to a terminal lug such as used in applying to switches, transformers and the like.

Referring in detail to the drawing, 15 and 16 represent the contiguous ends of cables or other conductors to be united. According to my invention, such cables or connecters are united by a sleeve-like connecter 17 formed of suitable metal possessing sufficient inherent resiliency so that when the bore 18 is expanded and then allowed to resume its normal diameter, the walls of the connecter will forcibly grip the conductor ends. The bore 18 is formed of a smaller diameter than that of the cable to which it is to be applied, hence the cable can only be inserted after the connecter is expanded. The difference between the initial diameter of the bore and the diameter of the cable determines the magnitude of pressure which will be maintained between the contacting surfaces thereof. The tubular connecter is preferably, though not necessarily so formed that the bore 18 is eccentric to the outer cylindrical surface of the connecter tube. However, tubular forms other than circular may be employed. However, it is regarded by me as an advantage to have the portion 19 of the connecter wall relatively thicker than the portion diametrically opposite thereto. Such diametrically opposite portion is provided with a longitudinally extending slot 20 which opens into the bore 18. The advantage of having the bore eccentric to the outer surface of the tubular connector, is that such an arrangement permits a greater expansion of the connector without sacrificing the strength thereof.

In order to precondition the connector for subsequent use in the field, it may be expanded at the factory by inserting in the bore a mandrel 21, such as indicated in Fig. 7, which is provided with tapered ends 22. While the connector is in this expanded condition, a separator 23 is inserted in the slot. The mandrel is then removed. This results in the production of the article of manufacture, illustrated in Figs. 8 and 9, comprising the expanded connector sleeve with the separator 23 assembled therewith.

This separator is preferably provided with suitable means for engagement with a tool, such as a screw driver or the like to facilitate the eventual removal of the separator, as illustrated in Fig. 8, where an overhanding projection of the lug 24 is provided. However, a slot or niche could be provided for a similar purpose.

In some cases, I contemplate not expanding the connector at the factory, but furnishing it to the user in an unexpanded condition. In such case, a simple device used in the field may be used to expand the connector by forcing apart the portions thereof adjacent the slot and then inserting the cables. Thereupon, the connector can be released so as to allow it to grip the cables. An expansion device similar to a clamp for engagement with the slot will suffice for such a practice.

With my improved connector, such as shown in Figs. 8 and 9, it will be readily apparent that, in order to make a cable joint, it is merely necessary to insert the ends 15 and 16 of the conductors into the bore of the connector and then to remove the separator by prying the same with a screw driver or by knocking it out with any suitable tool. Upon removal of the separator, the inherent resiliency of the metal will cause the connector to firmly grip the contiguous wires and practice shows that a joint of satisfactory electrical conductivity is thus secured. The firm grip made by the inherent resiliency of my connector effects a substantially permanent joint as distinguished from readily separable connections which are usually adapted to be made and broken by hand operation. Mechanical means are necessary for expanding my connecter as distinguished from the prior art devices in which the connections are adapted to be made and broken by hand operation. The connecter may be made of various metals, but I regard bronze as one of the most desirable materials. However, other materials such as copper, or strong aluminum alloys or spring steel may be used.

The connecter is adapted for use in joining copper or aluminum cables and in fact may be used for joining non-conducting parts as well.

In the modification shown in Fig. 3, the connecter 17ª is provided with two eccentric bores 18ª and 18ᵇ for engagement with cables of different diameters. Figs. 10 and 11 show the application of the invention to multiple connecters 17ᵇ and 17ᶜ, Fig. 10 being adapted for joining two pairs of conductors. In the modification of Fig. 11, I show parallel connecter portions 17ᵉ and 17ᵈ adapted to be connected with the ends of a pair of parallel conductors and 17ᶠ represents a connecter portion by means of which a tap may be taken off from the conductors which are connected by the portions 17ᵈ and 17ᵉ.

In the modification of Fig. 12, I have shown a connecter portion 17ᵍ having a slot 20ᵍ therein. This connecter is provided with a terminal lug 25 apertured at 26 for engagement with a suitable bolt or other fastening devices for attachment to switches, transformers, bus bars or other electric equipment. While the connecter described is peculiarly well suited for the joining of cables or conductors, it is apparent that the principle of first expanding the tubular member and holding it in the expanded position by a removable separator and then allowing it to contract is adapted to the connecting of rods or suitable bus bars together and also to the connecting of other elements, such as pipe railings and the like.

While I have described quite precisely the steps in the method of making cable conductor connections and the specific features of the preferred embodiments of the connecter illustrated, it is not to be construed that I am limited thereto since various modifications and substitutions of equivalents may be made by those skilled in the art without departure from the invention as defined in the appended claims.

What I claim is:

1. As an article of manufacture, a cable connecter comprising a tubular body of resilient metal with a pre-expanded longitudinal bore to receive the cable ends to be joined, said body having a longitudinal slot therein opening into the bore, and a separator in said slot adapted to be removed after the insertion in the bore of a part to be joined.

2. As an article of manufacture, a conductor connecter comprising a tubular body of resilient metal with an eccentric pre-expanded longitudinal bore to receive the ends of conductors to be joined, said body having a longitudinal slot therein opening into the bore and a separator in said slot holding the connecter expanded and adapted to be removed after the insertion in said bore of said conductor ends.

3. As an article of manufacture, a cable connecter comprising a body of metal of relatively high resiliency having a longitudinal bore, a longitudinal slot in the body opening into said bore, a separator in said slot, said separator having a shoulder portion for engagement with a suitable tool to facilitate its removal from the slot.

4. As an article of manufacture, a cable connecter comprising a body of metal of relatively high resiliency having a longitudinal bore, a longitudinal slot in the body opening into said bore, a separator in said slot, said separator having an overhanging projection for engagement with suitable tool to facilitate its removal from the slot.

5. As an article of manufacture, a cable connecter comprising a body of metal of relatively high resiliency having a plurality of longitudinally extending bores therein each adapted to receive ends of conductors to be joined, respective slots in said body extending longitudinally of and opening into said bores, and separators in said slots adapted to be removed after the insertion in said bores of the ends of conductors to be joined.

6. As an article of manufacture, a cable connecter comprising a body of resilient metal with a pre-expanded bore adapted to receive the contiguous stranded ends of cables to be joined, said body being longitudinally slotted through to the bore to facilitate expansion thereof for initial engagement with said ends and a separator assembled with said body effective to hold the bore expanded to a size to permit free insertion of the cable ends and adapted to be removed after such insertion whereby the inherent resiliency of the metal body will serve to so forcibly grip said cable ends as to make a substantially permanent connection of high electrical conductivity.

7. As an article of manufacture, a connecter comprising a body of resilient metal with a bore therein adapted to forcibly grip the ends of parts to be joined, said body being longitudinally slotted through to the bore, the wall portion of said body being thickest in the zone opposite the slotted portion and gradually decreasing in thickness toward said slotted portion and a separator assembled in said slotted portion to facilitate free insertion of the conductor ends in said bore.

8. As an article of manufacture, a connecter comprising a tubular spring metal body having an eccentric bore therein to receive and forcibly grip the ends of parts to be joined, said body being longitudinally slotted through to the bore at a zone substantially opposite the thickest wall portion thereof and a separator assembled in said slotted portion to facilitate free insertion of the conductor ends in said bore.

9. The method of joining conductors which comprises providing a split metal connecter sleeve with a bore of slightly smaller diameter than the ends of the conductors to be joined, expanding the sleeve and inserting a separator to hold it in expanded condition, inserting the ends of the conductors in the expanded sleeve, then removing said separator thus permitting the sleeve to contract and firmly grip the conductor ends.

10. The method of joining conductors which comprises providing a longitudinally split connecter sleeve of resilient metal having an eccentric bore therein, expanding said sleeve and inserting a separator in the split portion thereof, inserting the ends of the conductors in said bore, then removing the separator to permit the sleeve to contract and thus firmly grip the conductor ends.

CONSTANTINE P XENIS.